March 13, 1956 R. O. BLENCH 2,738,276
AROMATISATION OF POWDERS
Filed Jan. 31, 1952 3 Sheets-Sheet 1
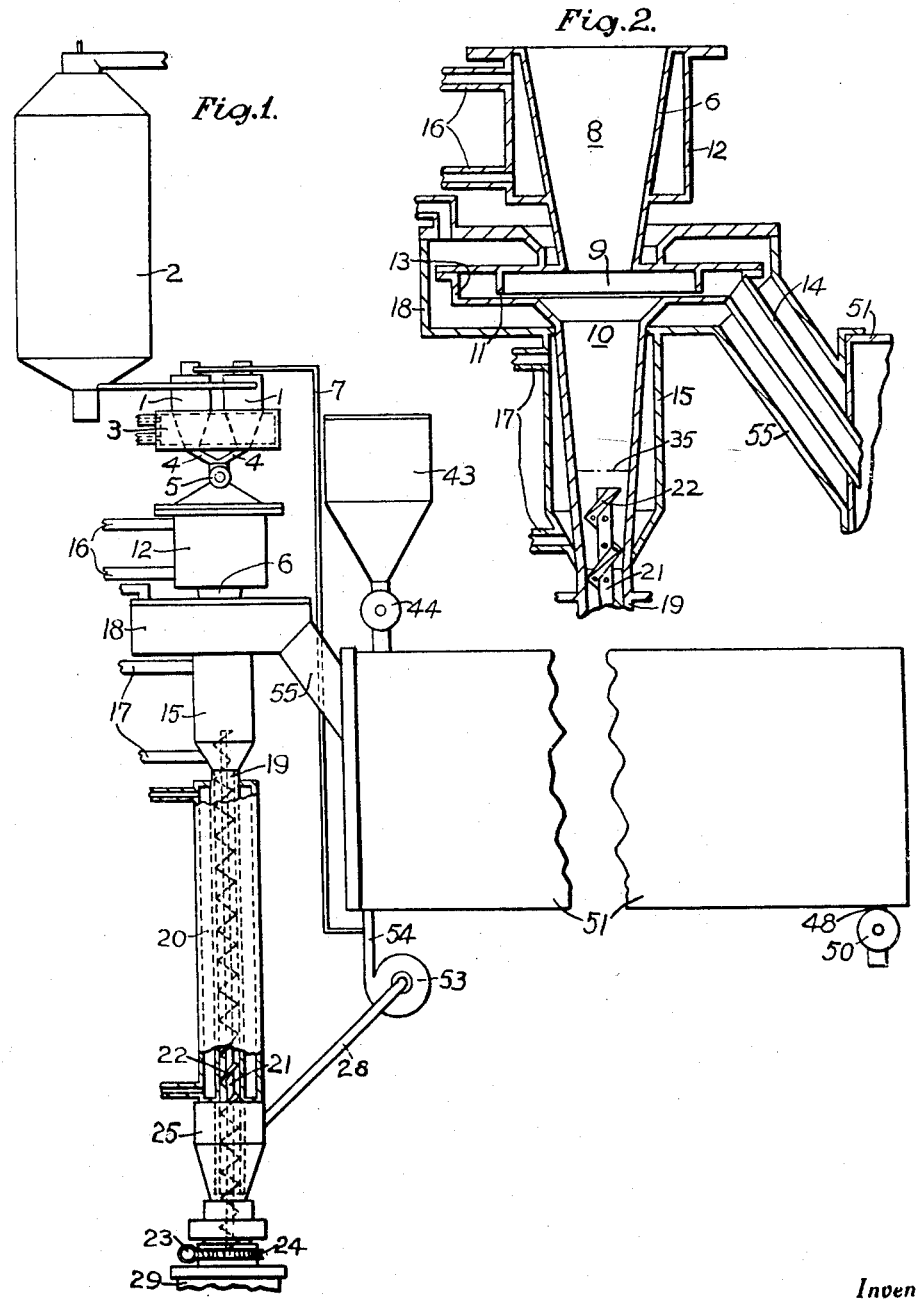
Inventor
Ronald Oliver Blench
By
Ferdinand Broster Bouchardt
Attorney

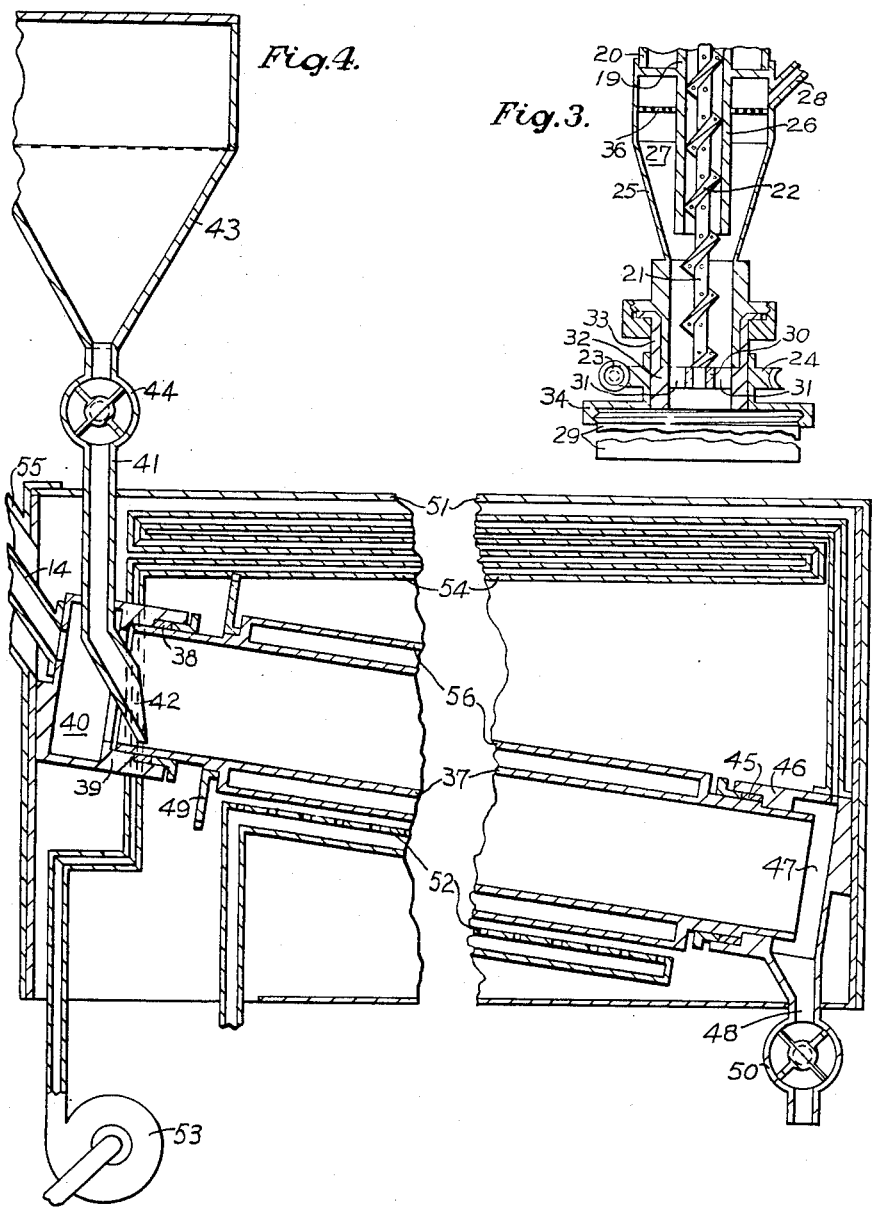

March 13, 1956   R. O. BLENCH   2,738,276
AROMATISATION OF POWDERS

Filed Jan. 31, 1952   3 Sheets-Sheet 3

Inventor
Ronald Oliver Blench
By
Ferdinand Broter Bosshardt
Attorney

United States Patent Office 2,738,276
Patented Mar. 13, 1956

2,738,276

AROMATISATION OF POWDERS

Ronald Oliver Blench, South Hayling, England

Application January 31, 1952, Serial No. 269,247

7 Claims. (Cl. 99—71)

This invention relates to the aromatisation of powders. It is not new to take aroma from a material or another source before an extract or concentration powder is prepared from the material and to introduce the said aroma to an extract or concentration powder prepared from dearomatised or non-dearomatised material, with a view to aromatising the powder in order that it shall be made to contain aroma substances such as some or all of the volatile aroma substances which are natural to the said material.

The affinity of the aroma substances for the powder is often so weak that the bond between the powder and some of the aroma is insufficiently strong to prevent, without the assistance of a careful storage and a hermetically sealed container, an escape of parts of the aroma from the powder after aromatisation. The bond is not strong enough to prevent a substantial loss of aroma if, as is practised in some of the processes, the powder or differently aromatised powders is or are stirred or otherwise mixed up in an attempt to obtain a mass of powder in which there is uniformity of aromatisation, because aroma escapes more readily from the surface of a mass of the powder than from the interior of the mass, and mixing up produces repeatedly new surfaces and therefore presents increased opportunities for, and encourages, the escape of the imparted aroma from the particles of the powder. This loss of aroma could be reduced by performing the mixing operation in an hermetically sealed machine, but the cost of plant and the cost and difficulty of the operation would be increased by such a machine.

In previously suggested aromatising processes the aroma is collected and carried from the material by an inert gas which is thereupon passed through a mass of the powder to be aromatised, the mass acting like a filter to filter the aroma out of the gas and retain it in itself. The result is that much of the aroma is trapped by that part of the mass through which the gas passes first, whilst the succeeding parts of the mass through which the gas thereupon passes receive less aroma, and therefore a uniformly aromatised product is not obtained. Stirring of the mass during the passage of the inert gas therethrough as heretofore suggested cannot be performed in a way which prevents a part of the mass from receiving and retaining more of the aroma substances than another part. Coffee aroma components of high boiling points such as between 130 C. and 145° C. obviously condense immediately they touch particles of the powder at room temperature or below. This lack of uniformity in the aromatisation of the powder results in the formation of large aggregates or lumps of the powder which do not mix satisfactorily into the rest of the powder to give a uniform product.

A more serious defect of the previously suggested aromatisation processes and their products is the loss of an important part of the aroma and the loss of some of each mass of powder subjected to aromatisation. These losses are caused by the continued deposit of important ingredients of the aroma on the part of the mass first met by the aroma laden inert gas. When the aroma laden inert gas at between 100–120° C. is in contact with powder as is necessary for a satisfactory aromatisation, there occurs a deposition of resin-like substances. The continued deposition of these substances results in the formation of a solid mass of powder where the contact is made. This solid mass after cooling becomes hard, dry and brittle. It is difficult if not impossible satisfactorily to break down and mix this solid lump with the rest of the powder. When, as is necessary for a satisfactory aromatisation, the gas is in contact with the powder below about 70° C., there is a deposition, not only of the said resin-like substances, but also of water, acetone, esters of low boiling point and other substances, all of which together form with the powder on which they accumulate, a semi-liquid messy substance which cannot be incorporated into rest of the mass of powder by a simple and uncostly mixing process. No matter how quickly and efficiently a mass of coffee powder at or below room temperature is stirred during the introduction of the heated laden gas to it, a sudden drop in temperature of the aroma substances of high boiling points is detrimental to the obtaining of a mass which is uniform in aromatisation and in other respects. These undesirable masses, because it is difficult or impossible to convert them into a powder suitable for mixing with the aromatised powder, are wasted unless re-processed and the volume of powder therefore suffers a reduction as a result of the aromatisation process. Furthermore the aromatised powder is caused to lack an important part of the aroma and is therefore inferior in that respect.

It is an object of this invention to provide a novel process and product which avoid the hereinbefore stated defects.

According to the said invention powder is aromatised by its subjection to an aroma laden inert gas, but, at least in the beginning of the subjection, no more of the powder is subjected in one amount to the aroma laden inert gas than can be substantially uniformly aromatised by contact of the inert gas therewith, whereby the whole of larger quantities of powder can be given an aroma which is substantially uniform throughout without recourse to any or much mixing of one part with another and therefore with reduced danger of loss of aroma and other deterioration due to extensive exposure to and mixture with the atmosphere.

The aroma laden inert gas may be caused to flow through powder which moves continuously or intermittently into and then out of contact with a continuous or intermittent stream of inert gas uniformly charged with violatilised aroma.

A stream of aroma laden inert gas may be caused to flow upwards or downwards through powder charged into the said stream and discharged therefrom in relatively small amounts.

The initial period of subjection of every portion of the powder to the aroma charged inert gas is restricted in duration to that required to impart a non-excessive amount of aroma to that portion.

The aromatisation is preferably effected by a process which consists in starting with the powder at a higher temperature than room temperature, subjecting substantially each particle individually of the powder to an aroma charged inert gas whilst the gas is carrying the whole of its charge of aroma and is at a higher temperature than the powder, then allowing the thus subjected particles to accumulate into a column and passing through it inert gas after the particles have been subjected individually to the said gas, the powder and inert gas being cooled during the passage of the already partly dearomatised inert gas through the accumulated powder in the column, whereby the inert gas is caused to distribute the first depositing aroma substance over all the particles of the powder in the form of an equal minute charge deposited directly on each particle and thereupon to give up other aroma substances to the same particles during and after accumulation.

The said process may be performed by having the temperature of the powder initially above room temperature, raising the temperature of the inert gas, creating a cascade-like fall of separated particles of the powder, flowing the inert gas to the falling separated particles and thereby bathing the separated particles therein, thereupon forming the particles into a descending and changing column and leading the inert gas through the said column after the inert gas has been flowed into the fall of particles and whilst the contents of the column are descending and changing.

Preferably the shower of particles of powder and the descent of the column are continuous, powder being introduced and discharged during the shower and the descent of the column and the inert gas being charged with aroma and circulated continuously through the shower and changing powder of the column so that a continuous output of uniformly aromatised powder ready for filling directly into the containers in which it is to be sold and requiring no mixing-up or other after treatment is obtained.

Some powders which can be aromatised by the hereinbefore specified process and apparatus are soluble powders such as the extract or concentrate powders obtained by preparing a watery infusion of coffee, including coffee mixtures or coffee substitutes or mixtures of coffee and a coffee substitute, or coffee with added carbohydrate such as dextrose dextrin maltose and/or sugar for milk powder, or of tea, and drying the infusion to produce a powder therefrom, or concentrate powders obtained by drying the juices and/or pulp of oranges and other fruits to produce a powder therefrom, or herbs or spices reduced to powders, or essence powders obtained from herbs, spices and plants, and so forth. Other powders are carbohydrates, such as lactose, malto-dextrin and so forth which are in powder form and are used for example for mixing with coffee extract powder after they have been aromatised.

The aroma substances may be obtained from similar material to that from which the extract or concentrate is prepared or from some part thereof as dried and ground fruit peel.

The inert gas is preferably nitrogen and reused repeatedly, a fresh charge of aroma being imparted to the gas before each use thereof.

The aromatisation for example of coffee extract powder is preferably effected by preparing a liquid coffee extract from dearomatised coffee, continuously spray drying the extract to a powder, continuously collecting the powder, continuously feeding the powder in relatively small amounts into the upper end of a gas-tight discharging chamber, continuously removing powder from the lower end of the chamber whilst maintaining a changing accumulation of powder in the lower part of the chamber, creating a continuous flow of freshly roasted and ground coffee through a heated, gastight charging chamber, heating and passing an inert gas, such as nitrogen, continuously through the charging chamber to charge the inert gas substantially uniformly with aroma volatilised from the roasted and ground coffee, passing the charged inert gas through the discharging chamber from the upper end or near the upper end to the lower end thereof and thereby causing aroma to be discharged uniformly from the inert gas into each small amount of coffee extract powder before it is removed from the discharging chamber, the inert gas being returned to the charging chamber for recharging after it has passed through the discharging chamber.

A novel apparatus for performing a process in accordance with my invention comprises a powder delivering device delivering into a primary aromatisation chamber which allows the delivered powder to descend through it and has inlet means through which inert gas can be fed to and join the descending powder in the chamber, the chamber being coolable and the inlet means being heatable, whilst a secondary aromatisation chamber is provided beneath the primary aromatisation chamber to hold an accumulation of the power descending from the primary chamber and a discharging device is provided in association wtih the secondary chamber to discharge the powder from the secondary chamber at the same rate at which the delivering device feeds it to the primary chamber, and an inert gas outlet is provided to cause the inert gas introduced by the inlet means to flow through the accumulated powder before it leaves the secondary chamber.

Preferably heating provision is made to prevent any fall in temperature of the inert gas from that at which it becomes charged with aroma until it makes contact with powder to be aromatised, whereby an undesirable and trouble-creating deposit of aroma substances on the apparatus instead of on the powder is prevented or reduced.

Means to attain this prevention may consist in heating means acting on the inert gas during the whole period occupied in passing from an aroma receiving zone to the powder.

Preferably the secondary chamber is also coolable and a separating device is provided to assist in the separation of the inert gas from the powder before the powder is discharged from the secondary chamber.

A sieve and/or agitating device is preferably provided in association with the primary chamber to encourage separation of the particles and therefore contact of the surface of each particle with the aroma laden inert gas at the time of introduction of the gas and powder into each other's presence.

A removably attached container or means for forming a fluid-tight junction with a container is preferably provided in association with the discharging device to enable the powder to be gathered without the possibility of the escape of aroma into the open atmosphere.

The inert gas may be charged by the passage thereof through a charging chamber through which material giving off volatile aroma substances is passed continuously or intermittently, the inert gas preferably being circulated from the said chamber through the powder and then back to the said chamber for recharging with aroma and thereupon again circulated from the said chamber through the powder.

The accompanying drawings illustrate diagrammatically apparatus for aromatising a powder, for example a coffee extract powder. In the drawings—

Figure 1 is a fragmentary side view, partly in section, of an apparatus for aromatising a powder.

Figure 2 is a fragmentary side view, in section, of a part of the said apparatus.

Figure 3 is a fragmentary side view, partly in section, of another part of the said apparatus.

Figure 4 is a fragmentary side view, partly in section, of still another part of the said apparatus.

Figures 2 to 6 are drawn to a larger scale.

Figure 5:
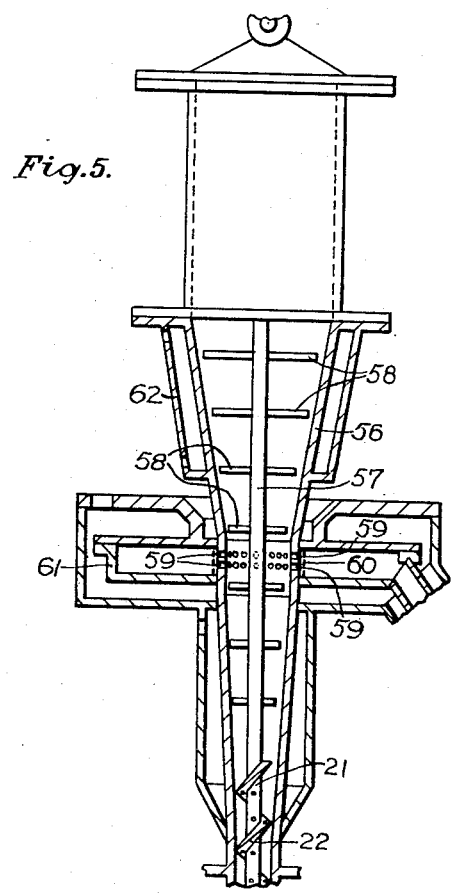
Figure 5 is a fragmentary side view in section of a part of an apparatus for aromatising a powder and illustrates another construction.

Referring to the drawings, in one example of apparatus and process performed with the aid thereof, closed collecting chambers 1, 1, Figure 1 are provided in which the powder, after production by spray drying an infusion or concentrate in a spray drier 2, is collected whilst still warm or hot from the heat used in spray drying. The closed chambers 1, 1 may be provided with means, such as a temperature controlling jacket 3 for heating it if the powder is insufficiently warm or hot when collected or keeping the powder from becoming hotter than is desirable. Outlets 4, 4 from the collecting chambers 1, 1 lead to a power driven delivering device 5 which controls the amount of powder allowed to escape therefrom and has for example vanes, measuring pockets, buckets or the like which deliver successive measured quantities of powder from the collecting chambers 1, 1. A primary aromatisation chamber 6, see also Figure 2, is connected in an air tight manner to the delivering device 5 which with the aid of the powder prevents leakage of any substantial amount of nitrogen from the primary aromatisation chamber into the collecting chambers 1, 1. To assist in this prevention, the collecting chambers may be air tight and subjected internally to a pressure equal to the pressure of the nitrogen for example by providing an equalising pipe 7 through which some of the nitrogen can flow into the collecting chamber at a very slow rate and therefore in very small quantity.

The primary aromatising chamber forms a vertical passage 6 having an upper zone 8, a middle zone 9 and a lower zone 10. The upper zone 8 of the passage narrows in the downward direction, as does also the lower zone 10, the cross-sectional size of the passage at the lower end of the upper zone 8 being smaller than that of the passage at the upper end of the lower zone 10. The cross-sectional area of the passage at the middle zone 9 is much larger than that of the lower end of the upper zone 8 and somewhat larger than that at the said upper end of the lower zone 10. At the junction of the lower zone 10 with the middle zone 9 there is an annular gap 11 in the wall of the passage to allow a radial inward flow of nitrogen into the passage from all directions and at all points round the periphery of the passage at the said junction. A temperature controlling jacket 12 is provided around approximately the upper three quarters of the wall of the upper zone 8. An annular gas distributing chamber 13 surrounds the wall of the middle zone 9 and the gap 11 has a gas supply pipe 14 through which nitrogen is forced into the distributing chamber 13 in order to create a continuous nitrogen flow through the gap 11 into the passage. A cooling jacket 15 is provided round the wall of the lower zone 10 and extends from near the upper end thereof downwards nearly to the lower end. Pipes 16 and 17 respectively are provided for conducting a suitable coolant, such as cold water to and from the two cooling jackets 12 and 15. A heating jacket 18 is provided round the gas distributing chamber 13 and the gas supply pipe 14 and hot gas is supplied to the heating jacket 18. Valves or other control means (not shown) are provided for controlling the action of the jackets 12, 15 and 18 so that the temperatures of the powder in the different zones 8, 9 and 10 and the temperature of the nitrogen until it enters the passage at the junction between the middle zone 9 and the lower zone 10 can be adjusted to ensure firstly that no temperature drop takes place in the nitrogen between the charging thereof with aroma and its initial contact with the powder and secondly that at the moment of initial contact with the powder, the charged nitrogen is at a higher temperature than the powder. It is advantageous to the aromatisation to have the powder at a temperature of about 60° C. to 80° C. whilst it enters and falls through the passage and to have the aroma charged nitrogen and parts with which it contacts before it meets the powder at a higher temperature at which it is charged and which does not exceed about 150° C. The flow of hot charged nitrogen meets the colder powder whilst the powder is falling from the middle zone 9 to the lower zone 10 cascade-like in a cloud or mist of particles which are in a more or less separated state. Substantially each colder particle encounters a fresh portion of the hotter stream of nitrogen before the charge of aroma of that portion has been tapped or commenced to leave the nitrogen. Therefore the surface of substantially every particle of powder is submitted to hot nitrogen before any part of the charge of aroma has been taken from or left the nitrogen and consequently substantially every particle of powder has a minute uniform amount of the less volatile aroma substances separately deposited on its colder surface under conditions which encourage a stable binding of the aroma substances to the particle. By this means the resin-like substance resulting from the deposition of less volatile aroma substances on the powder is so uniformly distributed in minute amounts between all the particles of the powder that its presence is difficult to detect and no part of the powder contains a sufficient concentration of the resin-like substance to leave an objectionably large undissolved residue when dissolved in the small quantities usually required, such as when preparing a beverage from the powder. Likewise, water, acetone, esters of low boiling point and so forth picked up with the aroma substances proper are distributed in minute portions between all the particles and therefore substantially no particle receives them in excess.

The nitrogen fills the passage and a stream thereof travels downwards with the descending cloud or mist of powder.

Because the powder, although kept at a lower temperature than the charged nitrogen, is kept at well above room temperature at the period of contact in the primary chamber 6, immediate condensation of all the heavier and medium volatile substances from the charged nitrogen is discouraged and these substances in the higher boiling point range are caused to condense more or less successively during the passage of the nitrogen and powder to the lower end of the passage 8, 9, 10 and the progressive fall in temperature which occurs in the said passage. The particles of powder are thereby given an opportunity to take up and bind the said substances to themselves by degrees and therefore more thoroughly.

The lower end of the primary chamber 6 is joined to a secondary aromatising chamber 19 which preferably is vertical and is long and narrow and furnished with a cooling jacket 20 whereby it can be kept at a low temperature which may be from 0° C. down to less than −80° C. according to which of the range of more highly volatile aroma substances are to be deposited in the powder.

If the apparatus is for aromatising a powder which does not readily flow down the secondary chamber merely under gravity, the secondary chamber has in it an upwardly extending spindle 21 provided with a feed screw 22 and the spindle 21 is rotated slowly, for example by a driven worm 23 meshing with a worm wheel 24 to which the lower end of the spindle 21 is fixed. The screw 22 keeps in downward motion powder present in the lower end of the zone 10 and in the secondary chamber 19. Connected to the lower end of the secondary chamber 19 there is a nitrogen separating device 25, see also Figure 3, through which the spindle 21 extends and which has a trunk 26 contained in and terminating short of the lower end of a separating chamber 27 which has a nitrogen outlet pipe 28 connected to its upper part so that nitrogen after descending through the powder in the trunk 26 rises and leaves through the outlet pipe 28 whilst the powder continues its descent and leaves the separating chamber 27 at its lower end. A filter 36 is provided in the separating chamber 27 to filter powder from the nitrogen passing to the pipe 28. The spindle 21 and/or feed screw 22 thereon are preferably perforated to allow the passage of nitrogen through it or them.

The feed screws 22, by preventing a free fall of the powder through the chamber 19, causes the powder to move down the chamber 19 in the same measured quantities or at the same rate as the delivering device 5 delivers powder to the primary aromatising chamber 6.

Where there is no feed screw or in addition to a feed screw there may be provided at the lower end of the chamber 27 a discharging device which is similar to the device 5 and may comprise vanes, measuring pockets, buckets or the like which discharge successive measured quantities of powder from the separating chamber 27. A storage jar or retailing container 29 can be removably connected in an air tight manner to the apparatus for the powder to fall into after it leaves the separating chamber 27. The spindle 21 and its feed screw 22 preferably commence and extend downwardly through the trunk 26 and the lower end of the separating chamber 27. The lower end of the spindle 21 is secured to a spider 30 having apertures 31 for the escape of the powder into the jar or container 29. The spider is provided on an extension 32 of a sleeve 33 which is rotatably mounted on the device 25 and carries the worm wheel 24 and a cap 34 into which the jar or container 29 is removably screwed to produce an air tight junction. The jar or container rotates with the sleeve 33.

Before the aromatising operation is started, the separating chamber 27, secondary chamber 19 and a part of the zone 10 are initially filled with powder up to a point shortly above the top of the spindle 21, for example up to the level indicated by the dot-and-dash line 35 of Figure 2, so that the nitrogen cannot deposit aroma on an exposed end of the spindle 21. There is thus produced a column of powder. During the aromatising operation, powder is constantly falling on to the top of the column of powder and is constantly being discharged from the lower end of the column, but there is always a column of powder and the column is descending with the aid of the spindle 21 and feed screw 22 and is constantly replenished with small amounts falling from above as it loses small amounts escaping from the bottom of the column. After the charged nitrogen has entered, filled and flowed down the primary aromatisation chamber 6 and given off part of its aroma charge to the particles of the falling cloud or mist of powder it flows downwards through the column of powder which has already been partly impregnated by the charged nitrogen with aroma whilst it was in falling cloud or mist form, the rate of flow of the nitrogen preferably being considerably greater than the rate of descent of the powder in the column. Because the aroma substances which form the said resin-like substance with the powder have already been taken from the powder cloud or mist before the nitrogen enters and flows through the powder column extending downwards from 35, it is not possible for a resin-like substance to be created whilst the nitrogen and powder are in association in the said column. However because the temperatures of the nitrogen and powder whilst in the primary chamber 6 are too high to condense many of the aroma substances, for example light volatile substances, but the temperatures are falling as the nitrogen and powder approach and proceed in contact down the secondary chamber 19, there occurs a delayed presentation of the light volatile substances in a state suitable for acceptance by the powder, and the powder then accepts the said substances. Furthermore the secondary chamber 19 by keeping the powder in a prolonged contact with aroma not previously discharged from the nitrogen, ensures the transfer of a very substantial proportion of each aroma substance having boiling points above the coolest temperatures in the secondary chamber 19. The progressive cooling which takes place produces a gradual transference which encourages the reception of larger amounts of aroma and the obtention by the powder of a more tenacious hold on the aroma. The bringing together of constantly fresh relatively small amounts of nitrogen and powder as they enter the secondary chamber 19 largely reduces the possibility of aroma starvation of a large portion of the powder due to another portion forming an aroma filter between the initially charged nitrogen and the said large portion.

When the powder and nitrogen leave the secondary chamber 19, the nitrogen is drawn or forced along the pipe 28 whilst the powder is discharged into the jar or container 29.

The said process and apparatus therefore ensure the production of a uniformly and richly aromatised powder having good aroma retaining properties without loss due to the formation of a resin-like substance or wasteful concentrations of water, acetone, esters of low boiling point and so forth in portions of the aromatised powder and without having to mix up the powder after aromatisation in order to produce a homogeneously aromatised product. They also make it possible to produce aromatised powder in a substantially continuous way and thus obtain in an economical manner a large output sufficient to meet commercial requirements.

Where the aroma substances are intended for the aromatisation of a coffee extract powder and are taken from relatively lightly roasted coffee whose moisture content after roasting is therefore relatively high, the transfer of the said substances would be liable to be accompanied by the transfer of so much moisture as to cause stickiness and agglomeration and lessen the keeping properties of the coffee extract powder if the said powder were made to take up all the said moisture. To avoid this difficulty, the hereinbefore described process may with advantage be used to aromatise one or more carbohydrates, such as lactose, malto-dextrin and so forth, in powder form with the coffee aroma substances. The carbohydrate powders may be able to absorb the said moisture without suffering a serious loss of the ability to flow freely and to keep. The aromatised carbohydrate or carbohydrates are then admixed with the coffee extract powder to aromatise the latter.

In order to conserve nitrogen and provide the necessary continuous flow of aroma charged nitrogen, the apparatus preferably includes a device for the continuous charging of nitrogen with aroma. The said device with advantage can comprise a tilted rotating tubular member 37, Figure 4, having at its higher end a gland 38 whereby it makes a fluid-tight joint with a stationary bearing 39 containing a chamber 40 which communicates with the interior of the member 37 and is connected to the nitrogen pipe 14 of the apparatus. A feed pipe 41 extends into the chamber 40, and has an outlet 42 situated in the tubular member 37 for delivering into the higher end of the member 37 a regular supply of non-dearomatised material whose aroma it is desired to transfer to the powder. The material is placed in a hopper 43 which is closed to the atmosphere. The material falls into a measuring device 44 which ensures a regular supply of material to the feed pipe 41. There is at the the lower end of the tubular member 37 a gas gland 45 which makes a fluid-tight joint between a stationary bearing 46 and the member 37. The bearing 46 supports the lower end of the tubular member 37 and has a chamber 47 in open communication with the interior of the lower end of the tubular member 37 and having an outlet 48 for disposing of the material after it has found its way by gravity along the member 37 which is rotated with the aid of a sprocket wheel 49 to encourage the passage of the material along the member 37. A measuring device 50 is provided to control the rate of disposal and prevent the escape of aroma from the outlet 48. The member 37 is in a hot air chamber 51 which may be open at a part of its lower end and is heated by a gas-burning heater 52 which is in the chamber 51 and also heats the air therein so that the member 37 is heated and the material is heated as it travels along the member 37.

The nitrogen outlet pipe 28 is connected to the intake of a motor-driven fan 53 whose outlet is connected to a nitrogen conveying pipe 54 which conducts the nitrogen drawn from the separating chamber 27 to the chamber 47 from whence, under the action of the fan 53, it is driven through the interior of the member 37, the chamber 40, the pipe 14, the chamber 13 and the slit 11 into and through the aromatising chambers 6 and 19 and the separating chamber 27. In this arrangement, the nitrogen flows in contra-direction to the material in the member 37. Alternatively the pipe 54 may be connected to the chamber 40 and the pipe 14 to the chamber 47 in order to cause the nitrogen to flow unidirectionally with the said material whilst passing through the member 37.

The nitrogen during its passage through the pipe 54 is heated by the heat in the chamber 51 to the same temperature as that existing in the member 37 and chamber 40. The heating jacket 18 is connected by a conduit 55 to the chamber 51 and receives its heat from hot air flowing from the chamber 51 through the conduit 55. This arrangement ensures that the temperature of the nitrogen shall not drop below that at which it was charged in the member 37 until it comes into contact with the particles of powder in 8, 9 and 10.

The intimate and prolonged contact of the nitrogen with the material whilst the material is being agitated by rotation of the member 37 and constantly with fresh material as it is fed to the member 37 results in a rich, uniform aroma charge being constantly received by the nitrogen each time it circulates through the member 37. Because the material and the nitrogen are subjected to the same temperature in the member 37, hot gas chamber 51, conduit 55 and heating jacket 18 there can be no temperature drop in the nitrogen from the time it enters the member 37 to the time it joins the powder in the primary chamber 6 and therefore condensation of the aroma with which the nitrogen is loaded in the member 37 cannot commence until the nitrogen meets the powder in the primary chamber 6.

A jacket 56, filled with glycerine or other suitable liquid of high boiling point, may be provided round the member 37 to avoid burning of the material by the heater 52 to heat the member 37 and air in the hot air chamber 51.

Sieves (not shown) and/or an agitator or vibrator (not shown) may be provided in association with the primary chamber 6 to promote the separation of the particles of powder from each other and their fall in cascade, cloud or mist form down the passage formed by the primary chamber 6.

The cooling jacket 20 on the secondary chamber 19 may be divided into an upper part and a lower part the lower of which is for use with a coolant which produces in the lower end of the secondary chamber 19 a cooling zone having a very low temperature, for example minus 80° C.

The initial temperature of the powder may be that of the residue of heat which it contains after being produced from a liquid by spray drying under heat, the usual step of cooling of the powder to about room temperature after spray drying being omitted.

Where roasting takes place prior to the extraction, it is carried out until the amount of residual moisture left in the roasted material is insufficient, when transferred to the powder, to impair the storage qualities of the powder. For example, in transferring aroma from 100 gms. of roasted and ground coffee containing 1% of residual moisture to its equivalent of spray-dried soluble extract powder, say 25 gms., the moisture content of the powder after aromatisation is increased by 4%. If the powder already contained about 4–5% of moisture, the total moisture content after aromatisation would make it uncertain whether the powder would be storable for a reasonable length of time without deterioration. As a preliminary of aromatisation, the production of the powder by drying therefore must proceed in such a manner that the dry powder has a moisture content which together with the moisture added in the aromatisation thereof should not exceed about 6%.

To increase the proportion of powder to moisture content, dry soluble carbohydrates may be added to the powder before aromatisation or to the powder after aromatisation. Alternatively, in the case of coffee extract powder, coffee roasted to contain little residual moisture may be used to supply the aroma. These procedures may be followed as additions or alternatives to the hereinbefore described use of one or more carbohydrates in powder form to receive the aroma and be then added to the extract powder or concentrate.

All parts which come into contact with the material from which the aroma substances are separated, with the inert gas charged with aroma substances and with the powder before and after aromatisation, must be of stainless steel or another suitable substance having no deleterious effect on the flavour or storage life of the product.

An aroma charged or non-charged inert gas may be arranged to blow the powder and thereby cause the particles to spread and separate and have intimate contact with the aroma substances in an enclosed space during the aromatisation of the powder.

By the hereinbefore described process and apparatus for the aromatisation of powder, the formation of aroma substances and coffee extract powder into a solid lump of very many times the powder particle size is prevented and the precipitation of the aroma substances is made gradual, successive, uniform and complete in respect substantially to each individual particle. The occurrence of some part of the treated powder carrying an excess of aroma substances whilst a paucity or absence of the same substances exists in another part is also prevented.

In another apparatus for charging the inert gas there is a chamber containing horizontal conveyor belts arranged one above the other so that roasted and ground coffee introduced through a hopper at the top of the chamber falls onto the uppermost belt, and is carried by it, to then fall on the next lower belt and be carried in the reverse direction and so forth until it is discharged from the lowermost conveyor belt. By means of a gas inlet in the lower end of the chamber, a gas outlet in the upper end and a system of baffles, the inert gas after heating is introduced into the chamber and guided along the upper sides of the belts in contradirection to the travel of the coffee to finally escape through the outlet to the annular member. The aroma driven off the coffee charges the inert gas as it streams over the coffee on the belts.

To enable the inert gas to be maintained in the charging chamber under the pressure required to circulate it through the coffee extract powder, and if necessary also through the roasted and ground coffee, the said coffee may be introduced into and discharged from the chamber through an arrangement of locks which allow only a relatively small escape of inert gas into the atmosphere.

If the aroma charged nitrogen, prior to passing through the powder, makes contact with surfaces which are much cooler than itself, vapour is condensed on the said surfaces. The consequent wetness of surfaces causes powder in contact therewith to cling to them and the descent of the powder into the aromatisation chamber 8 is thereby made irregular or stopped. Some of the aroma charged nitrogen finds its way into contact with said surfaces. To discourage the said condensation the surfaces leading from the delivering device 5 to the chamber 8 can be made longer than is shown and be of a material having a low heat conductivity, such as aluminium. For example a tube of aluminium of about the same length to the chamber 8 can be interposed between the delivering device 5 and the chamber 8. The temperature of the tube at that end which is in contact with the chamber 8 is substantially the same as that of the chamber 8. The temperature at the other end of the tube is lower, but the temperature along the tube falls only gradually from that of the chamber 8. The tube therefore avoids a sharp or sudden cooling of the nitrogen and therefore a condensation which would interfere with the free flow of the powder.

In another construction which avoids the said condensation, instead of having zones through which the powder falls in cloud like form, the apparatus has a continuous passage 56, Figure 5, through which there projects a rod 57 having stirring arms 58 which serve to prevent the powder from remaining clinging in the passage and thereby ensure movement of the powder downwards through the said chamber. The said rod may be a continuation of the spindle 21 and be rotated thereby, or be separate therefrom and be rotated from above.

The wall of the chamber is provided with an annular row or rows of small perforations 59 covered by fine gauze 60 and leading from a distributing chamber 61 which is supplied with charged nitrogen in a similar manner to the chamber 13, into the passage 56. The upper part of the passage 56 is provided with a heat controlling jacket 62. In all other respects the apparatus is similar to that described with reference to Figures 1 to 4. In operation, powder supplied to the upper end of the passage 56 fills the same and descends in a massed state down the passage in a continuously moving column which reaches the secondary aromatisation chamber in the hereinbefore described manner. As the column of powder descends past the perforations 59, it is met by aroma charged nitrogen flowing into the powder through the perforations. The charged nitrogen penetrates to the centre of the column and permeates the column from all sides. Because the powder at this point in its descent is considerably above room temperature, the aroma substances carried by the nitrogen do not instantaneously condense on coming into contact with the powder, but condensation is delayed until the inflowing charged nitrogen has permeated that portion of the column which registers momentarily with the perforations. Each portion of the column after receiving an initial permeation by the nitrogen as it descends past the perforations, gives way to another portion of the column which then receives its correct portion of newly arriving aroma charged nitrogen and therefore of aroma. Each portion of the column therefore receives its own initial permeation, whereupon the portions proceed to and through the secondary aromatising chamber where they are cooled down in a continuously moving, changing column whilst still being in contact with charged nitrogen. By this treatment, substantially every particle of the powder receives its own individual charge of aroma and substantially no particle remains under protracted exposure to freshly arriving, freshly charged nitrogen and therefore no excessive amounts of condensed aroma substances can be given to substantially any of the particles of powder.

Figure 6:
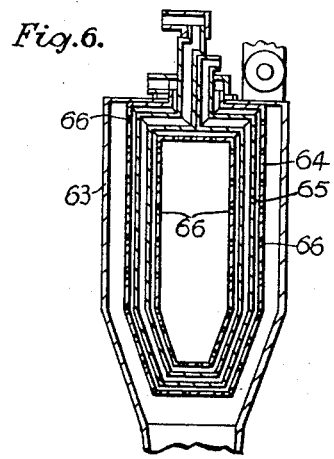
Figure 6 is a fragmentary side view in section of a part of an apparatus for aromatising powder and illustrates still another construction.

In still another arrangement the zones 8 and 9 are replaced by a chamber 63, Figure 6 into which the powder is introduced substantially continuously at a uniform measured rate and which is provided with a stirring member 64 projecting downwards and driven from above, the stirring member 64 being in the form of a conduit containing a heating tube 65 and having perforations 66 through which charged nitrogen forced into the conduit can issue along parts of the stirrer in contact with the powder. The remainder of the apparatus is similar to that described with reference to Figures 1 to 4. In operation the powder descending in a massed state through the chamber 63 is stirred by the stirrer 64 which during stirring injects charged nitrogen into all parts of the powder through its perforations and thereby effects an initial aromatisation of substantially each particle separately, the descent of the powder during agitation by and contact with the stirrer being constant and therefore new particles of powder continually coming into contact with the charged nitrogen whilst other particles which have already been in initial contact with nitrogen carrying its initial aroma charge, no longer is in contact with such nitrogen but is subjected only to the action of nitrogen from which a part of the aroma charge has already been given up to the powder.

I claim:

1. In a process of production of coffee aromatised powder, the steps of contacting coffee aroma laden inert gas with a cascading shower of soluble powder initially at a temperature of 60 to 80° C., the said gas being initially at a temperature which is higher than the initial temperature of the said powder but does not exceed 150° C., then flowing the partially dearomatised gas through the powder in a constantly changing column subjected to cooling, and thereupon separating the dearomatised gas from the aromatised powder.

2. In a process of production of coffee aromatised powder, the steps of contacting coffee aroma laden inert gas initially at a temperature of more than 80° C. but not exceeding 150° C. with a cascading shower of coffee extract powder initially at a temperature of 60 to 80° C., then flowing the partially dearomatised gas through the coffee extract powder in a constantly changing column subject to cooling, and thereupon separating the dearomatised gas from the aromatised coffee extract powder.

3. In a process of production of aromatised coffee powder the steps of contacting coffee aroma laden inert gas initially at a temperature of 100 to 150° C. with a cascading shower of at least one carbohydrate in powder form initially at a temperature of 60 to 80° C., then flowing the partially dearomatised gas through said powder in a constantly changing column subjected to cooling, separating the dearomatised gas from the aromatised powder, and mixing the aromatised powder with coffee extract powder.

4. In a process of production of aromatised coffee powder, the steps of contacting coffee aroma laden inert gas with a cascading shower of coffee extract powder containing at least one carbohydrate in powder form, with the powder initially at a temperature of 60 to 80° C. and and the gas initially at a temperature which is higher than that of the initial temperature of the powder but does not exceed 150° C., then flowing the partially dearomatised gas through said powder in a constantly changing column subjected to cooling, and thereupon separating the dearomatised gas from the aromatised powder.

5. A process of continuous production of aromatised coffee powder, comprising the steps of creating a continuous flow of freshly roasted and ground coffee, continuously heating an inert gas and passing it over the heated coffee for charging it with volatile coffee aroma, meanwhile preparing a liquid coffee extract from dearomatised coffee and continuously spray-drying the extract to a powder, then continuously contacting the coffee aroma laden inert gas with a cascading shower of the coffee extract powder, then continuously flowing the partially dearomatised gas through the coffee extract powder in a constantly changing column subjected to cooling, thereupon continuously separating the dearomatised inert gas from the aromatised powder by continuously removing powder from the lower end of the column, and continuously returning the dearomatised inert gas for reheating and repassing over the heated coffee for recharging it with coffee aroma, the coffee extract powder being at 60 to 80° C., and the aroma charged gas being at a higher temperature not exceeding 150° C. at the time of contacting of the gas with the cascading shower of coffee extract powder.

6. A process of continuous production of aromatised coffee powder according to claim 5, wherein at least one carbohydrate in powder form is added continuously to said spray-dried extract powder before contacting of the powder with aroma charged inert gas, for reducing the relative moisture content of the aromatised coffee powder.

7. A process of continous production of aromatised coffee powder according to claim 5, wherein at least one carbohydrate in powder form is added to the aromatised powder after aromatisation for reducing the relative moisture content of the aromatised powder.

References Cited in the file of this patent

UNITED STATES PATENTS

| | | |
|---|---|---|
| 309,485 | Munzinger | Dec. 16, 1884 |
| 552,127 | Howie | Dec. 31, 1895 |
| 814,909 | Killer, Sr. | Mar. 13, 1906 |
| 981,549 | Goodlett | Jan. 10, 1911 |
| 995,956 | Gaebel | June 20, 1911 |
| 1,251,359 | Etaix | Dec. 25, 1917 |
| 1,367,726 | Trigg | Feb. 8, 1921 |
| 1,991,564 | McLain et al. | Feb. 19, 1935 |
| 2,087,602 | McCrosson | July 10, 1937 |
| 2,480,146 | Lee | Aug. 30, 1949 |
| 2,513,813 | Milleville | July 4, 1950 |
| 2,680,687 | Lemmonnier | June 8, 1954 |